No. 766,532. PATENTED AUG. 2, 1904.
F. SCHMITT.
DEVICE FOR SAFEGUARDING VESSELS.
APPLICATION FILED OCT. 14, 1903.
NO MODEL. 3 SHEETS—SHEET 1.
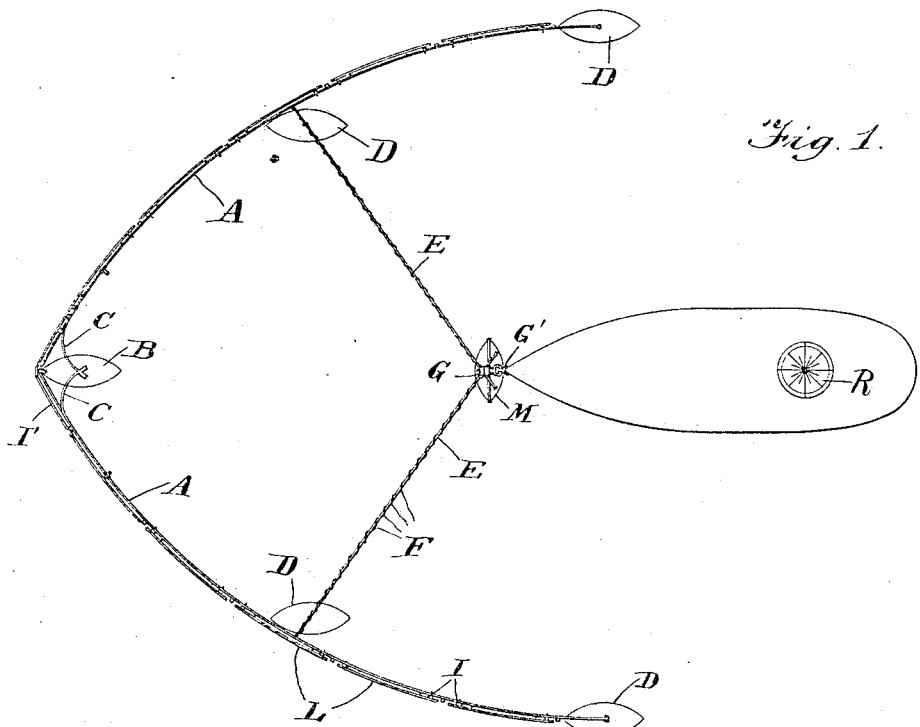
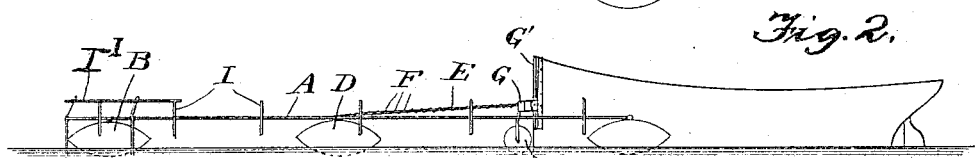
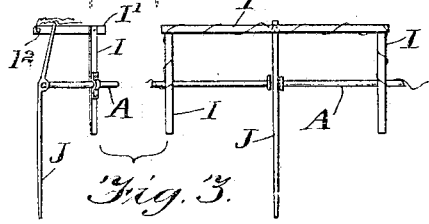
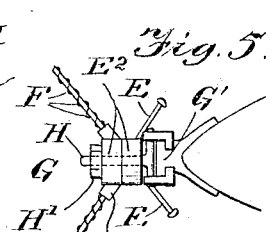
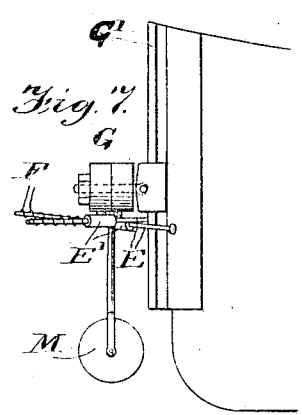
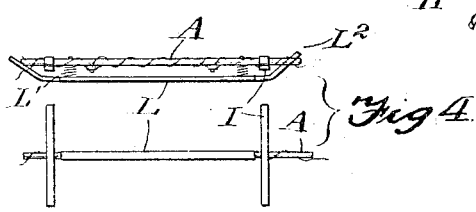
Witnesses:
H. B. Hallock.
L. H. Morrison.
Inventor:
Frank Schmitt,
By No. 766,532. PATENTED AUG. 2, 1904.
F. SCHMITT.
DEVICE FOR SAFEGUARDING VESSELS.
APPLICATION FILED OCT. 14, 1903.
NO MODEL. 3 SHEETS—SHEET 2.

Witnesses:

Inventor:
Frank Schmitt,

No. 766,532. PATENTED AUG. 2, 1904.
F. SCHMITT.
DEVICE FOR SAFEGUARDING VESSELS.
APPLICATION FILED OCT. 14, 1903.
NO MODEL. 3 SHEETS—SHEET 3.

Witnesses:
H. B. Hallock
L. H. Morrison

Inventor:
Frank Schmitt,
By W. Preston Williamson
Atty.

No. 766,532. Patented August 2, 1904.

UNITED STATES PATENT OFFICE.

FRANK SCHMITT, OF PHILADELPHIA, PENNSYLVANIA.

DEVICE FOR SAFEGUARDING VESSELS.

SPECIFICATION forming part of Letters Patent No. 766,532, dated August 2, 1904.

Application filed October 14, 1903. Serial No. 176,935. (No model.)

*To all whom it may concern:*

Be it known that I, FRANK SCHMITT, a subject of the King of Hungary, residing at Philadelphia, county of Philadelphia, and State of Pennsylvania, have invented a certain new and useful Improvement in Devices for Safeguarding Vessels, of which the following is a specification.

My invention relates to a new and useful improvement in a system for preventing collisions between vessels and for preventing vessels from striking stones, sand-bars, or other obstructions, and has for its object to provide such a device adapted to travel ahead of the vessel, so as to notify the captain of the vessel of any danger ahead. My device is so constructed as to not only notify the captain when danger threatens, but to notify him to what quarter to look for the obstruction.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 8:
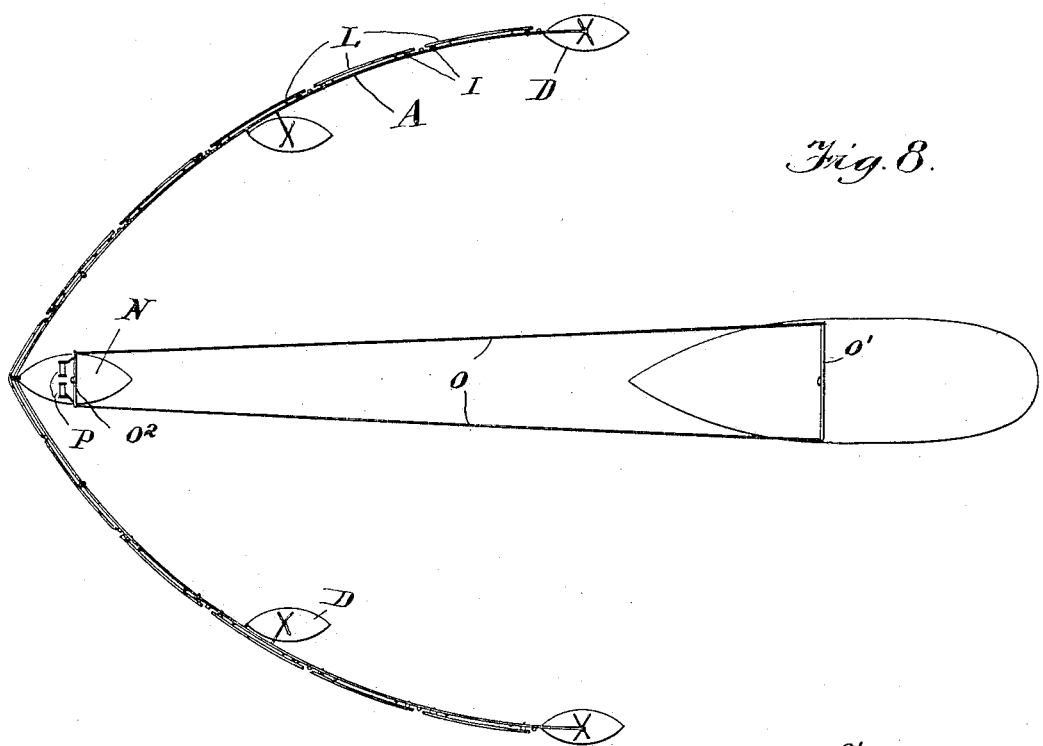
Figure 9:
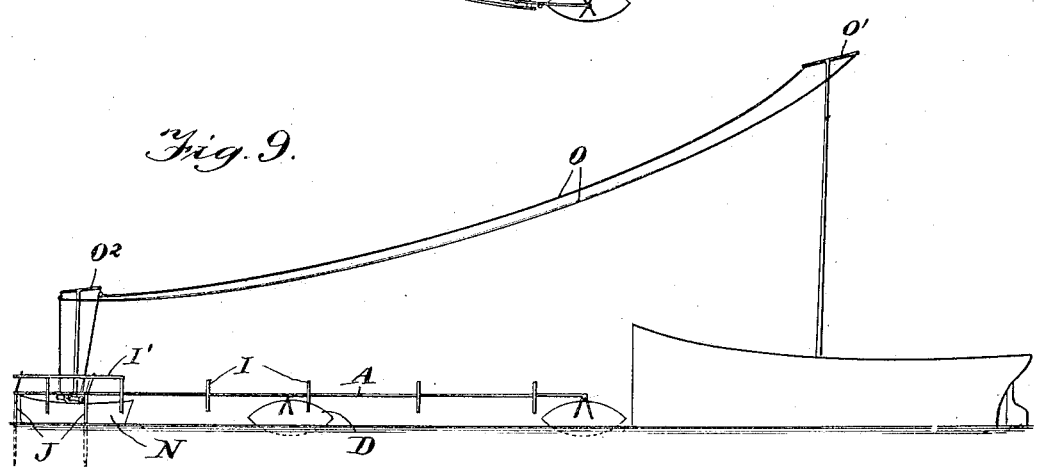
Figure 10:
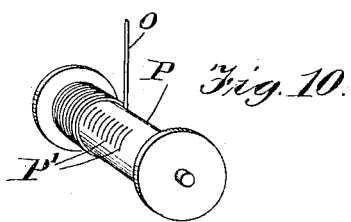
Figure 11:
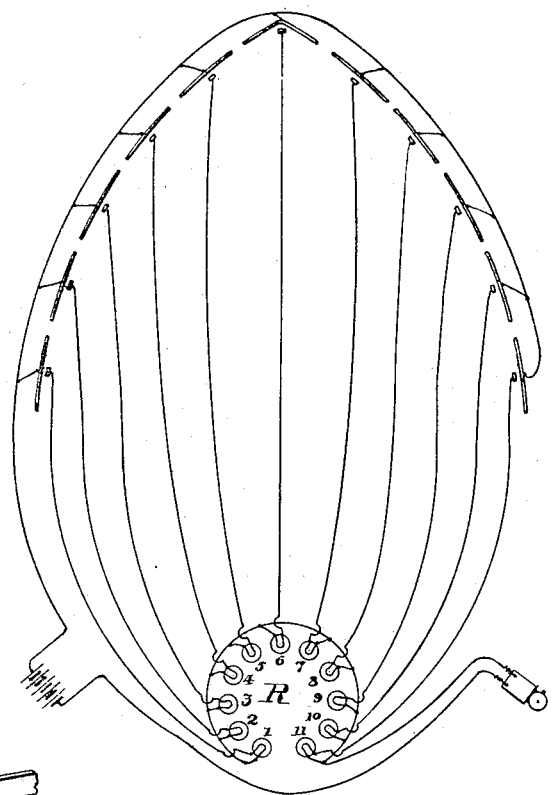
Figure 12:
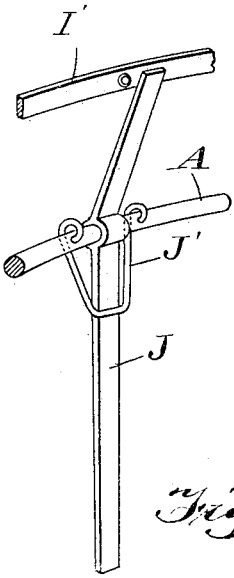
Figure 13:
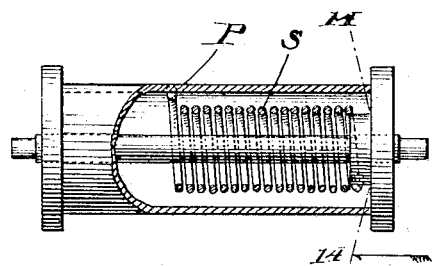
Figure 14:
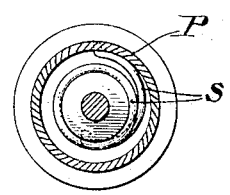

Figure 1 is a plan view of my device attached to the vessel; Fig. 2, a side elevation of my device attached to the vessel; Fig. 3, a front view and a vertical section of the devices at the forward end of the guard for preventing the vessel from striking objects below the water; Fig. 4, a plan view and a front elevation of one of the contact-strips attached to the guard; Fig. 5, a plan view of the attachment at the bow of the vessel; Fig. 6, a perspective view of one collar and sleeve carrying the rods; Fig. 7, a side elevation of the bow of the vessel; Fig. 8, a plan view of a vessel, showing a modified form of my device applied thereto; Fig. 9, a side elevation of Fig. 8; Fig. 10, a perspective view of one of the drums around which the cables are wound. Fig. 11 is a diagrammatical view showing the circuits connecting the electrical contacts with the annunciator; Fig. 12, a perspective view of the contact device which is adapted to come in contact with objects under the water; Fig. 13, a side elevation of the spring-roller used in connection with the device as shown in Figs. 8, 9, and 10, a portion of this roller being broken away and shown in section to show the interior spring; Fig. 14, a section taken on the line 14 14 of Fig. 13.

A represents the guard, which is formed bow-shaped and is made of a rod of steel or other suitable metal. This guard is arranged to travel a certain distance ahead of the vessel and is of substantially an equal distance from the vessel at all points. The guard is preferably made of two parts joined together at the center for convenience in detaching and is designed to be supported at a slight distance above the water-line by means of floats. B represents the forward float directly ahead of the vessel, and this guard is attached to the float by rods extending downward from the guard. For the purpose of bracing the guard at the forward end the curved braces C branch inward from each half of the guard and come together directly over the float B and are attached to this float by means of uprights.

D represents other floats arranged at suitable intervals for supporting the structure and are connected to the structure by means of uprights.

The guard A is attached to the vessel by means of the rods E, the outer ends of these rods being attached to the guard about midway between the center and each end, and the other ends of the rods extend through sleeves E', carried by a swivel attachment secured at the forward end of the vessel. A spring F surrounds each rod and is interposed between the sleeves and the guard, so that when an obstruction strikes the guard it will press the rod on that side through its sleeve and compress the spring, and when the obstruction is removed the spring will return the guard and rod to its normal position, the rods being headed at their inner ends to prevent withdrawal from the sleeves.

The attachment G at the forward end of the vessel is designed to slide vertically upon the guide G', this guide being provided with grooves upon each side and the rear end of the attachment being provided with inturned lugs adapted to fit said grooves. A horizontal shaft H extends forward, and the rear end of this shaft is pivoted horizontally to the lugs which slide in the guide. The sleeves E', through which the rods E extend, are provided with collars $E^2$, which surround the shaft H, and therefore are free to turn around the shaft independent of one another, a nut H' being threaded upon the shaft outside of the collars. Thus it will be seen that by means of this form of attachment three movements are allowed. This attachment may be slid vertically in the guide G', or it may have a vertical rocking movement upon the horizontal pivot, or each rod E may have a vertical rocking movement by being pivoted upon the shaft H. In this manner the guard and floats may accommodate themselves to all movements of the vessels or waves.

The guard A is divided in a number of spaces or degrees, and each space or degree is bounded by upright bars I, secured rigidly to the guard A. These uprights extend a distance above the guard and also a slight distance below the same. Any number of these spaces or degrees may be provided around the guard, and at a number of these spaces or degrees directly in front of the vessel (in the drawings shown as three spaces) I provide a cross-strip I', joining the uprights I together at the top, and upon the guard in the middle of each of these spaces I pivot a rod J, which extends downward a distance in the water a little greater than the draft of the vessel, and the upper end of this rod J above the pivotal point extends slightly above the cross-bar I', and this cross-bar I' carries a contact-button $I^2$, which is electrically connected with an annunciator R, located on board the vessel. The rod J is normally held away from the electric button by means of a spring J'; but should the lower end of the rod J strike a sand-bar, rock, sunken wreck, or any other obstruction the upper end of the bar J will be pressed in contact with the electric button, which button will be caused to make a contact which will establish an electric current, actuating the annunciator R, and thus show the captain that there is danger ahead from an object beneath the water. Outside of the guard at each space or degree is arranged a separate strip L, and each strip is provided with two pins projecting inward near each end of the strip, said pins passing through suitable blocks secured to the guard, a head being provided upon the pins inside of the blocks to prevent the withdrawal of the pins from the blocks. Springs L' are interposed between the strips and the block, so as to normally hold the strips outward away from the guard. Attached to the guard at each space or degree is one or more electric buttons, which are electrically connected with the annunciator on board the vessel, each degree or space being provided with a separate wire extending to the annunciator, so as to notify the captain which strip has been operated, and therefore tell him in which direction to look for the threatened danger. These electric wires may be wound around the guard and extend to the vessel along the rods E.

When the guarding structure comes in contact with another vessel, rock, or any other obstruction, the strip L at the point where the guard first strikes will be pressed inward and operate the electric button or buttons of that degree, and thus notify the captain at once, and he can save his vessel by steering in the opposite direction. By a predetermined set of whistle-signals each boat can notify the other boat in what direction they are traveling when the guards of two boats strike, so that said boats may steer their course so as to avoid a collision.

Each end of the strips L are bent inward at an incline toward the guard, as shown at $L^2$ in Fig. 4, and these bent-in ends cross the guard, so that when the guard of another vessel strikes the guard of the vessel with which it is in danger of colliding and the two guards slide past each other there will be no danger of the ends of the strips being caught.

The attachment at the forward end of the vessel is held upward and supported by means of the rolling float M, which is journaled in suitable bearings, which bearings terminate in a standard extending upward and attached to the lugs which slide in the guide G'.

In Figs. 8, 9, and 10 I have shown a modification in which the guard A is not attached to the vessel by rods, but is carried ahead of the vessel by a boat N, operated by its own power, and this boat is adapted to contain one or more men, who are in telephone connection with the vessel and can notify the captain of whatever danger threatens the vessel. This guarding structure is designed to travel a considerable distance ahead of the vessel and is only connected to the vessel by means of the cables O, said cables being attached to each end of a cross-piece O', secured in the mast of the vessel, and said cables run over pulleys attached to each end of a cross-piece $O^2$, secured to a mast extending upward from the upper boat carrying the guard, and each end of these cables O are wound around a drum P, a separate drum for each cable, and upon the interior of these drums are coil-springs S, which springs will be wound up as the cable unwinds from the drum. These drums are marked with a series of graduations P', which will be exposed as the cable unwinds. Thus if the power-boat travels faster than the ship the cables will be unwound from the drums, and thus show the operators in the boat the distance it is ahead of the vessel, and if the boat travels to the right or left of the vessel one of the cables will be pulled upon more than the other, and thus notify the operators that they must steer in the opposite direction, and as the distance decreases between the boat and the vessel the springs within the drums will wind up the drums to take up the slack in the cables. If desired, the conducting-boat may be connected to the vessel by only one cable, and in that way all of the instructions could be given through a telephone connection.

When it is desired to have the vessel come into a dock or when it is desired to remove the guard for any other purpose, the two halves of the guard may be detached from one another and may be either taken on board the vessel or arranged along the side of the same.

The guard may be made in different sizes and forms and of different materials.

Of course I do not wish to be limited to the exact construction here shown, as slight modifications could be made without departing from the spirit of my invention—as, for instance, the electrical contacts could be made in any manner desired and any number of floats could be used to properly support the structure—my main claim being for an advance guard containing contacts which will automatically notify the captain on board the vessel not only of the threatened danger, but also at which point to look for the obstruction.

Having thus fully described my invention, what I claim as new and useful is—

1. In a device of the character described, a guard adapted to travel ahead of a vessel, said guard consisting of a resilient rod of steel bent so as to conform to the shape of the bow of the vessel but considerably larger than the same, floats adapted to support said guard above the water, rods extending from the guard to the bow of the vessel, an attachment secured to the bow of the vessel through which the rods pass and are adapted to slide, springs coiled around said rods and interposed between the attachment and the guard, said attachment adapted to slide vertically upon the bow of the vessel and also pivoted so as to have a vertical rocking movement, a rolling float supporting said attachment, electric contacts arranged at intervals around the guard, electric wires extending from said contacts to an annunciator on board the vessel, said contacts adapted to be brought together when the guard strikes a resisting body, as and for the purpose specified.

2. In a device of the character described, a bow-shaped guard consisting of a resilient rod of steel adapted to travel a distance ahead of the vessel, floats adapted to support said guard at a distance above the water-line, rods connected to the guard and extending inward to the bow of the vessel, a vertical guide secured to the bow of the vessel, a sliding block adapted to slide within said guide, a float adapted to support said block, a shaft pivoted to said block horizontally, two collars surrounding said shaft and adapted to move upon the shaft independent of one another, a sleeve secured to each collar through which the rods extend, springs interposed between the sleeves and the guard, electric contact devices arranged at intervals around the guard and upon the outside of the same, electric wires leading from each contact to an annunciator on board the vessel, said contacts adapted to be brought together when striking a resisting body and extending from a slight distance above the water-line to a distance above the guard, as and for the purpose specified.

3. In a device of the character described, a bow-shaped guard of spring-steel adapted to travel ahead of the vessel, floats supporting said guard at a distance above the water-line, means for flexibly connecting said guard with the vessel, a series of strips arranged at equal intervals around the outside of the guard, pins extending inward from said strips and adapted to slide through blocks secured to the guard, springs surrounding said pins and interposed between the blocks and the strips, one or more electric buttons secured to the guard behind each strip, electric wires extending from the buttons to an annunciator on board the vessel, uprights secured to the guard between the strips, a cross-piece connecting together a number of these uprights at the forward end of the guard, rods pivoted upon the guard and extending downward into the water to a depth a little greater than the draft of the vessel, the other end of the rods extending upward above the cross-piece, electric buttons secured to the cross-pieces, said electric buttons adapted to be pressed by the rods when the lower end of the rods strike a resisting body below the surface of the water, and electric wires connecting these buttons with an annunciator on board the vessel, as and for the purpose specified.

In testimony whereof I have hereunto affixed my signature in the presence of two subscribing witnesses.

FRANK SCHMITT.

Witnesses:
  MARY W. HAMER,
  L. W. MORRISON.